(12) United States Patent
Chu

(10) Patent No.: US 9,351,089 B1
(45) Date of Patent: May 24, 2016

(54) AUDIO TAP DETECTION

(75) Inventor: Wai C. Chu, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 731 days.

(21) Appl. No.: 13/420,451

(22) Filed: Mar. 14, 2012

(51) Int. Cl.
*H04R 29/00* (2006.01)
*H02B 1/00* (2006.01)

(52) U.S. Cl.
CPC ........................... *H04R 29/00* (2013.01)

(58) Field of Classification Search
CPC ........... G01H 3/10; G01H 3/14; H04R 29/00; H04R 29/004
USPC .................. 381/74, 56, 95, 58, 123
See application file for complete search history.

(56) References Cited

U.S. PATENT DOCUMENTS

| | | | | |
|---|---|---|---|---|
| 5,488,636 | A * | 1/1996 | Yamada | H04L 7/0334 327/91 |
| 8,634,565 | B2 * | 1/2014 | Asada | G06F 1/1626 381/122 |
| 2007/0079206 | A1 * | 4/2007 | Arora | G06F 3/038 714/745 |
| 2011/0249824 | A1 * | 10/2011 | Asada | G06F 1/1626 381/56 |
| 2012/0112930 | A1 * | 5/2012 | Ivanov | G06F 3/01 341/20 |
| 2012/0223885 | A1 | 9/2012 | Perez | |

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Vivian Chin
*Assistant Examiner* — William A Jerez Lora
(74) *Attorney, Agent, or Firm* — Lee & Hayes, PLLC

(57) ABSTRACT

Techniques are described for recognizing an audio double tap or other tapped audio sequences generated by a user. Amplitudes of an audio signal are processed to generate an energy function or curve. The energy curve is analyzed to detect audio pulses. Detected pulses are validated and double tap events are detected based on features such as duration, power, and/or symmetry, plus additional rules related to the structure of the audio event.

20 Claims, 4 Drawing Sheets

AUDIO TAP DETECTION

BACKGROUND

User interfaces have traditionally relied on input devices such as keyboards, which require physical manipulation by a user. Increasingly, however, it is desired to detect and monitor the physical positions and movements of users within a scene or environment, and to respond to more natural user actions.

Speech recognition may be used in some situations for recognizing user commands. However, it may sometimes be desired to reliably detect or recognize other types of sounds, which may be non-verbal, and to respond to such sounds. In particular, some types of devices may respond to user-generated taps or double-tabs, such knocking on a surface, snapping the fingers of a hand, or clapping two hands together.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described below are systems and techniques that recognize and respond to one or more audio taps made by a user. An audio tap may be produced when a user knocks on a surface such as a wall or table, for example. An audio tap may also be produced by clapping two hands together, by tapping other objects against each other, or by other means.

In the description below, techniques are described for recognizing a double tap, which comprises two sequential audio taps such as might result from rapidly knocking or tapping on a surface. However, the same techniques may be useful in detecting other types of tap sequences, including triple-taps and other multiple tap sequences having regular or irregular rhythms.

In the described embodiment, a system uses an audio sensor such as a microphone to capture audio samples. The audio samples are processed to generate a sequence of energy values or amplitudes. The amplitudes are analyzed to detect transient changes, which are referred to as pulses and are assumed to correspond to local peaks in amplitude. Detected pulses are then validated based on duration and symmetry. Signal-to-noise evaluations may also be used when validating pulses.

Valid pulses are then examined to determine whether they meet certain criteria associated with a double tap or other audio event. In certain environments, this may include timing criteria as well as power characteristics and relationships. An audio event is identified and/or declared for the audio samples if these criteria are satisfied.

Figure 1:
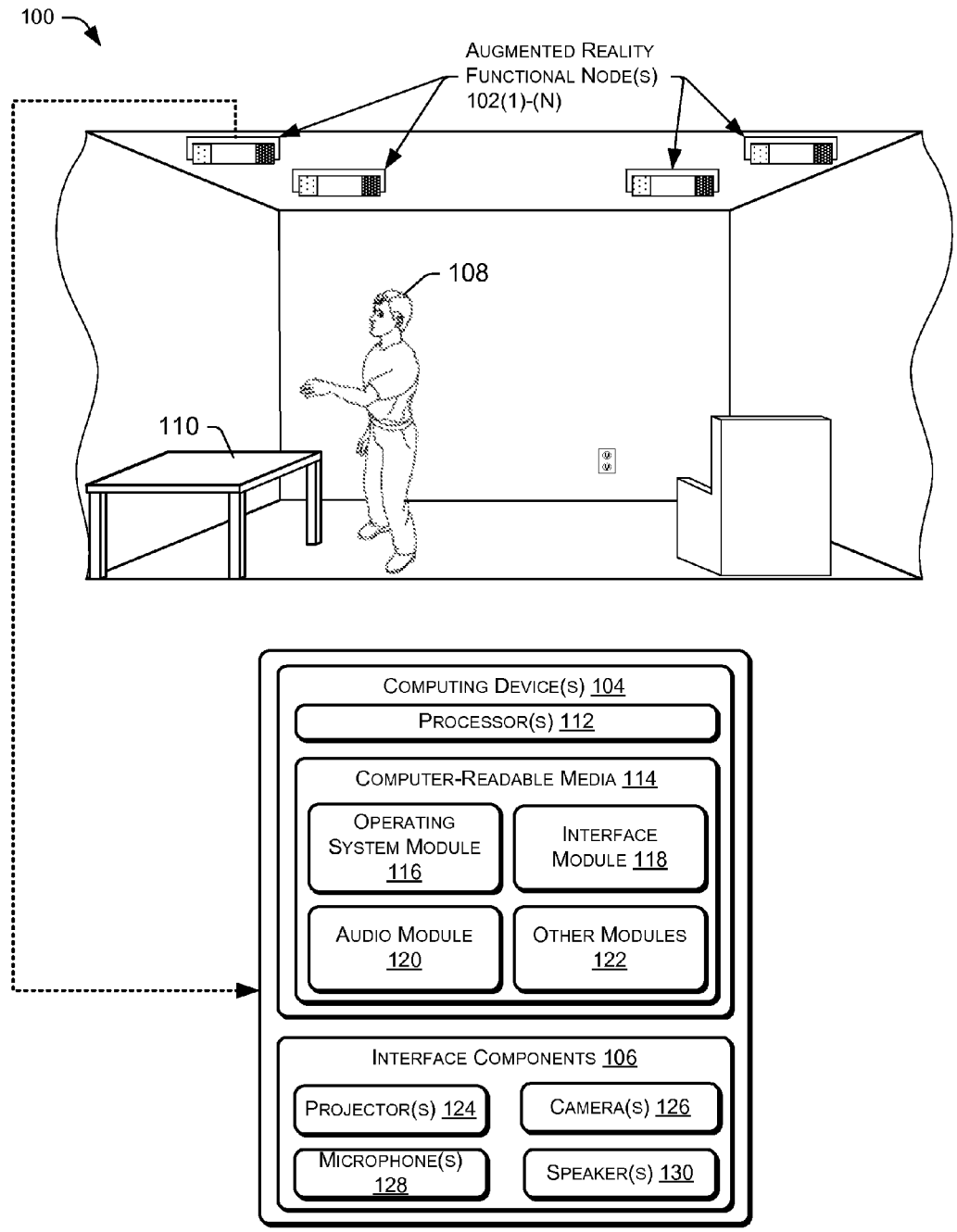
FIG. 1 illustrates an environment that includes an augmented reality functional node (ARFN) that monitors and responds to user activities such as audio taps.

FIG. 1 shows an illustrative augmented reality environment 100 in which the described techniques may be performed. The environment 100 includes one or more augmented reality functional nodes (ARFNs) 102(1), ..., 102(N) (collectively referred to as "the ARFN 102" in some instances). While the environment illustrates four nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices.

As illustrated, each ARFN 102 may include one or more computing devices 104, as well as one or more interface components 106. The computing devices 104 and interface components 106 may be configured in conjunction with each other to interact with a user 108 within the environment 100. As an example, the user 108 may double tap a table 110 within the environment, and the ARFN 102 may respond in any manner, such as by projecting certain content on the surface of the table 110, such as an interactive menu, a video, a book, an image, or any other sort of visual content. In some environments, the ARFN 102 may be configured to detect or identify the surface upon which the double tap was made, and to project the content onto that surface.

As illustrated, the computing device 104 of the example ARFN 102 may include one or more processors 112 and computer-readable media 114. The processor(s) 112 may be configured to execute instructions, which may be stored in the computer-readable media 114 or in other computer-readable media accessible to the processor(s) 112. The processor(s) 112 may include digital signal processors (DSPs), which may be used to process audio signals in accordance with the techniques described as follows.

The computer-readable media 114, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 104. The computer-readable media 114 may reside within a housing of the ARFN, on one or more storage devices accessible on a local network, on cloud storage accessible via a wide area network, or in any other accessible location.

The computer-readable media 114 may store various modules, such as instructions, datastores, and so forth that are configured to execute on the processors 112. For instance, the computer-readable media 114 may store an operating system module 116 and an interface module 118.

The operating system module 116 may be configured to manage hardware and services within and coupled to the computing device 104 for the benefit of other modules. The interface module 118, meanwhile, may be configured to receive and interpret commands received from users within the environment 100, and to respond to such commands in various ways as determined by the particular environment.

The computer-readable media 114 may also include an audio module 120 that is executable to perform audio processing. In particular, the audio module 120 may implement the techniques described below for detecting audio tap events such as double taps.

The computer-readable media 114 may contain other modules 122, which may be configured to implement various different functionality of the ARFN 102.

The ARFN 102 may include various interface components 106, such as user interface components and other components that may be used to detect and evaluate conditions and events within the environment 100. As examples, the interface components 106 may include one or more projectors 124, one or more cameras 126, one or more microphones 128, and one or more speakers 130. The interface components 106 may in certain implementations include various other types of sensors and transducers, content generation devices, and so forth.

The projector(s) 124 may be used to project content onto surfaces of the environment 100 for viewing by the user 108. In addition, the projector(s) 124 may project patterns, such as non-visible infrared patterns, that can be detected by the camera(s) 126 and used for 3D reconstruction and modeling of the environment 100. The camera(s) 126 may be used for various purposes, such as determining the location of the user 108, detecting user gestures, determining the positions of objects within the environment 100, reconstructing 3D characteristics objects within the environment 100, and so forth.

The microphone(s) 128 may be disposed within a chassis of the ARFN 102, or elsewhere within the environment 100. The microphone(s) 128 may be used to acquire input from the user 108, may be used to determine the location of a sound, and/or may be used to otherwise aid in the characterization of and receipt of input from the environment 100. For example, the user may make particular noises, such as a tap on a wall or snap of the fingers, which are pre-designated as attention command inputs or audio events. Such audio inputs may be located within the scene using time-of-arrival differences among the microphones.

The speaker(s) 130 may be used by the ARFN 102 to provide audible output. For example, the speaker(s) 130 may be used to provide output from a text-to-speech module or to playback pre-recorded audio.

The coupling between the computing device 104 and the interface components 106 devices may be via wire, fiber optic cable, wireless connection, or the like. Furthermore, while FIG. 1 illustrates the computing device 104 as residing within a housing of the ARFN 102, some or all of the components of the computing device 104 may reside at another location that is operatively connected to the ARFN 102. In still other instances, certain components, logic, and/or the like of the computing device 104 may reside within a projector or camera. Therefore, it is to be appreciated that the illustration of the ARFN 102 of FIG. 1 is for illustrative purposes only, and that components of the ARFN 102 may be configured in any other combination and at any other location.

Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment, such as televisions, stereo systems, lights, and the like.

In other implementations, the components of the ARFN 102 may be distributed in one or more locations within the environment 100. For example, the microphone(s) 128 and speaker(s) 130 may be distributed throughout the environment. The projector(s) 124 and the camera(s) 126 may also be located in separate chasses. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Figure 2:
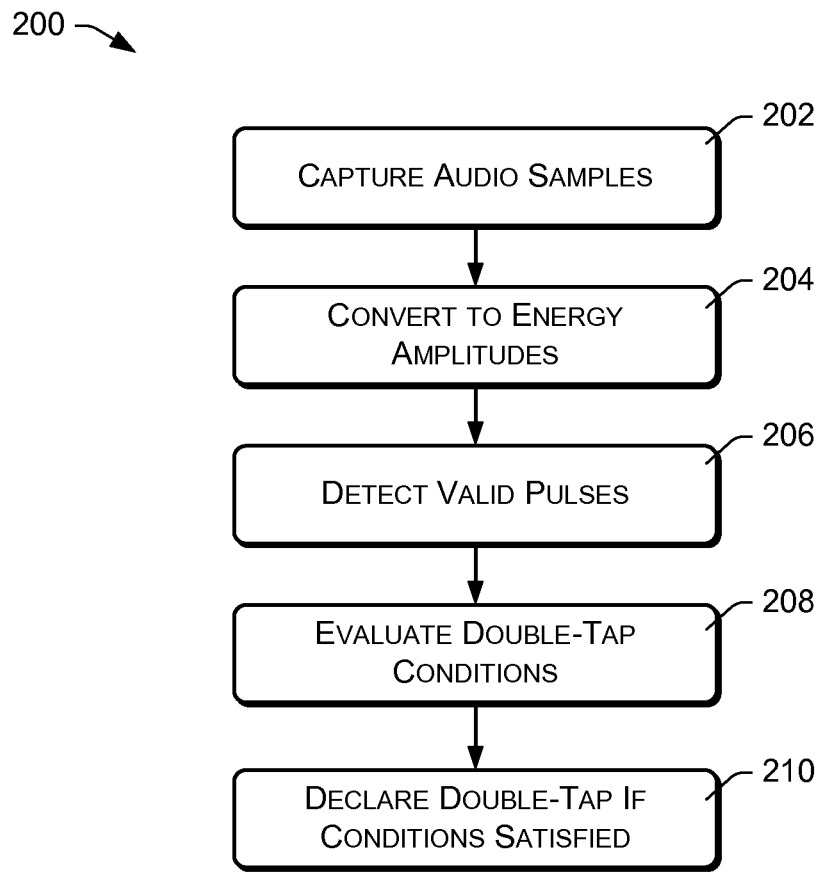
FIG. 2 is an example flow diagram of an ARFN analyzing an environment to detect user-generated double tap events.

FIG. 2 illustrates an example of how the ARFN 102 may be used to detect and identify a double tap generated by the user 108 within the environment 100. More specifically, FIG. 2 illustrates an example method 200 of detecting a double tap audio event. The method 200 will be described as being performed in the environment 100 of FIG. 1. However, the method 200 may be performed in other environments, in conjunction with different types of systems or equipment.

An action 202 may comprise capturing audio samples using the microphone(s) 128 or other input sensor of the ARFN 102. In practice, this action may comprise receiving and recording sequential digital audio amplitude values from logic or circuitry associated with the microphone(s) 128. The audio samples may represent audio within the environment 100 for a preceding time period. For example, the audio samples may represent the most recent few seconds of audio.

Figure 3:
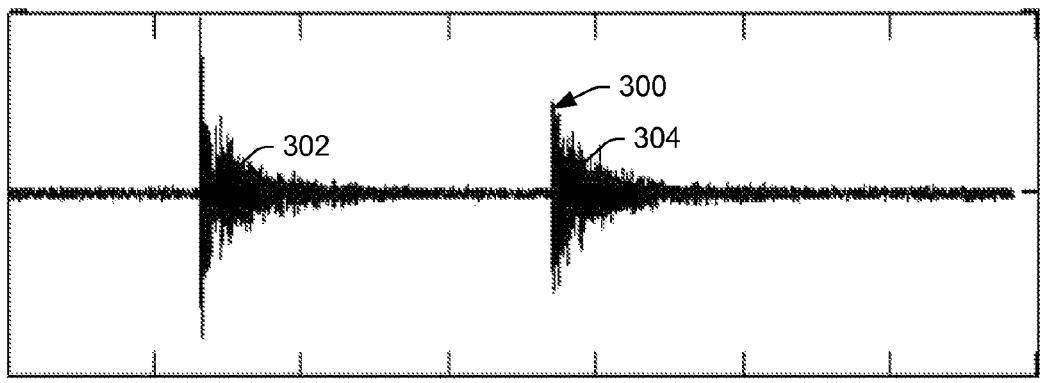
FIG. 3 is a graph showing a signal curve resulting from a user-generated double tap event.

FIG. 3 shows a representative audio amplitude waveform or samples 300 resulting from a double tap audio event in a quiet environment. The samples 300 represent an approximately 0.7 second segment of audio, and include an adjacent pair of pulses 302 and 304, corresponding to user-generated tap events. The pair of pulses 302 and 304 corresponds to a double tap event. Time is represented in FIG. 3 by the horizontal axis. Signal amplitude is represented by the vertical axis.

Returning to FIG. 2, an action 204 may comprise converting the captured audio samples to a sequence of audio energy amplitudes. In the described embodiment, this is performed by segmenting the amplitude values of the audio sample into non-overlapping or overlapping frames, representing sequential time periods. The audio energy is then calculated for each frame. Thus, each energy amplitude is based on a plurality of audio samples corresponding to a single frame.

In certain embodiments, an energy calculation may be based on a summation of squared audio signal amplitudes corresponding to a frame of the audio samples. For example, assuming that a frame of the audio samples is represented as discrete amplitude values s[n], where n=0 to N−1 and N is the number of samples in the frame, the energy E of an individual frame may be calculated as $E=\Sigma_{n=0}^{N-1} s[n]^2$.

Figure 4:
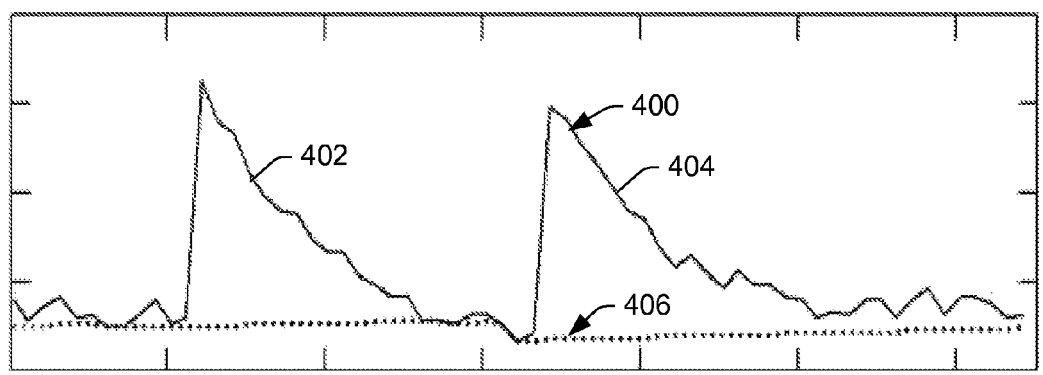
FIG. 4 is a graph showing an energy curve resulting from a user-generated double tap event.

FIG. 4 shows an example energy waveform or curve 400 such as might result from the audio double tap shown in FIG. 3. The energy curve 400 comprises a temporal sequence of audio energy amplitude values corresponding to sequential series of audio frames (the horizontal axis corresponds to time and the vertical axis corresponds to energy). In this example, each frame is based on 1024 sample amplitude values, representing a duration of 11 milliseconds. The energy curve 400 indicates a first pulse 402 and a second pulse 404.

FIG. 4 also shows a noise energy curve 406 corresponding to the energy curve 400. Noise energy at a particular time, corresponding to a particular energy amplitude, may be calculated as the minimum of:
  the immediately previous energy amplitude; or
  the immediately previous noise energy multiplied by a constant that is slightly larger than 1, such as 1.01.

Signal-to-noise ratio (SNR) may be calculated based on the energy curve 400 and the noise energy curve 406:

$$SNR=10*\log(energy/noise\_energy)$$

Referring again to FIG. 2, an action 206 comprises detecting valid pulses in the captured audio sample that correspond to user-generated taps. This may be performed by analyzing the energy curve 400.

Figure 5:
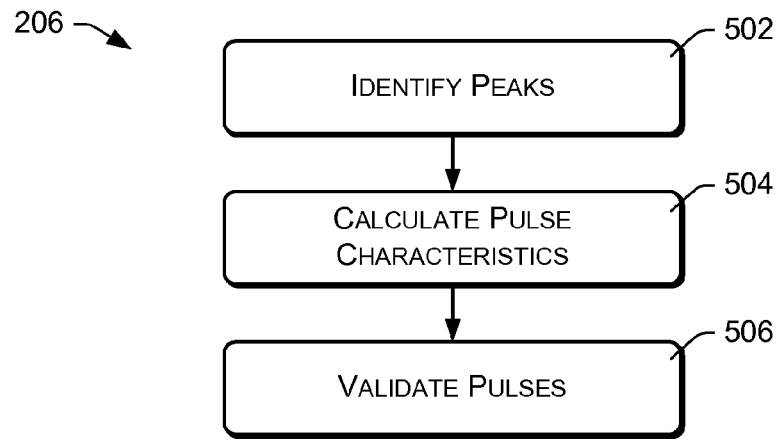
FIG. 5 is an example flow diagram illustrating the validation of energy pulses in the energy curve of FIG. 4.

FIG. 5 illustrates the action 206 of detecting or identifying pulses in captured audio samples 300, by analyzing the energy waveform 400. An action 502 may comprise identifying local peaks in the energy waveform 400. It is assumed that each local peak corresponds to a pulse. In some embodiments, identifying local peaks may comprise identifying any energy value having adjacent energy values that are lower than itself. The time at each such identified peak is referred to as the peak time of the pulse.

In some embodiments, local peaks are considered as pulses only if their SNR is larger than a given threshold. For example, a particular energy curve value is only considered as a peak if its corresponding SNR is greater than 5 dB.

An action 504 comprises identifying and/or calculating pulse characteristics corresponding to each of the peaks identified in the action 502. A set of pulse characteristics is calculated for each identified peak, based on the identified peak times.

Figure 6:
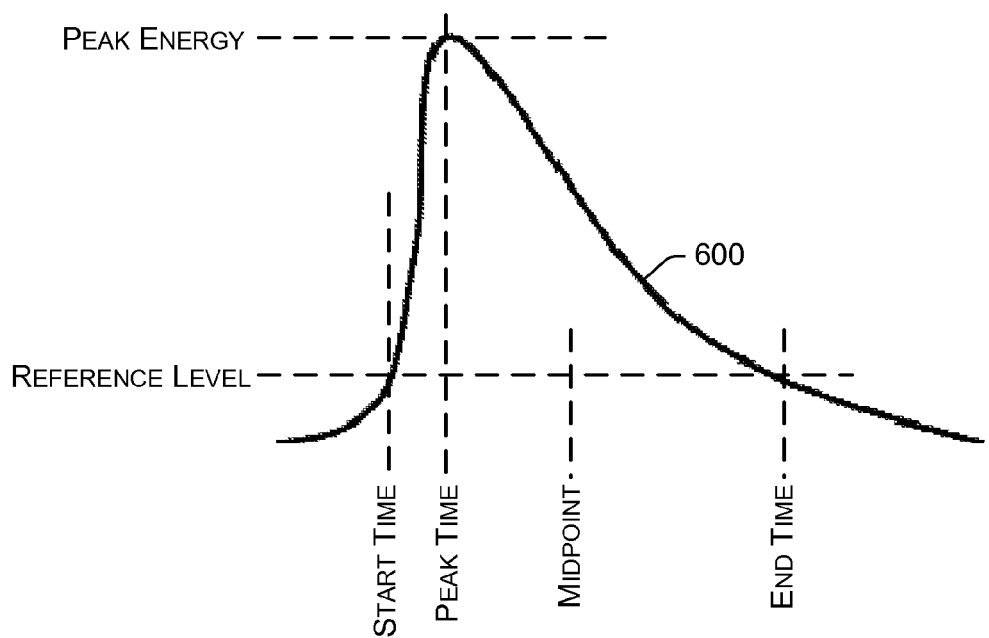
FIG. 6 is a diagram illustrating an idealized energy pulse and various parameters relating to the energy pulse.

FIG. 6 illustrates certain pulse characteristics that may be identified or calculated, in relation to an idealized energy pulse 600. In the described embodiment, the peak time is established as described above, by identifying a local peak in the energy waveform. Based on the peak time, the peak energy is noted. The peak energy is the energy value at the peak time.

A reference level is calculated based on the peak energy. Specifically, the reference level may be calculated as a fraction of the peak energy. For example, the reference level may be calculated as K*peak energy, where K is a value between 0.01 and 0.1.

A start time may be defined as the time at which the energy pulse 600 rises to the reference level, prior in time to the peak time. An end time may be defined as the time at which the energy pulse 600 falls back to the reference level, subsequent in time to the peak time.

A midpoint or mid time is defined as the midpoint between the start time and the end time:

(start time+end time)/2.

Based on the parameters shown in FIG. 6, several other pulse characteristics or parameters may be calculated. The duration of a pulse may be calculated as the end time minus the start time:

duration=end time−start time

The power of a pulse may be calculated as a function of pulse energy and pulse duration:

$$power = \frac{\sum_{t=start\ time}^{end\ time} energy[t]}{duration}$$

The symmetry of an individual pulse may be calculated based at least in part on the cumulative energy of a portion of the individual pulse, wherein cumulative energy is a sum of energies of a series of adjacent amplitudes. For example, the symmetry may be based on a sum of the amplitudes of the first half of the pulse, relative to a sum of the amplitudes of the last half of the pulse or to the sum of the amplitudes of the pulse in its entirety:

$$symmetry = \frac{\sum_{t=start\ time}^{midpoint} energy[t]}{\sum_{t=start\ time}^{end\ time} energy[t]}$$

Returning to FIG. 5, an action 506 may comprise validating pulses based on their identified characteristics. Specifically, the pulses corresponding to the peaks identified in the action 502 are analyzed to determine whether the pulses represent valid tap events. In certain embodiments, this analysis may be based on duration, power, and/or symmetry of each pulse. More specifically, a pulse is validated, and considered to represent a valid tap event, when at least the following conditions are satisfied:

The pulse has a duration within a predefined range, such as between 43 and 150 milliseconds.

The pulse has a symmetry greater than 0.7.

The pulse is no nearer than a threshold time from any neighboring pulse. For example, 53 milliseconds is a threshold time that may be used in certain embodiments.

Pulses that satisfy these conditions are referred to as valid pulses. Pulses that do not satisfy these conditions are referred to as non-valid pulses. The actions of FIG. 5 potentially result in a set of valid pulses and a set of non-valid pulses. Valid pulses are those pulses that are likely to have resulted from respective taps by a user.

Returning now to FIG. 2, an action 208 may comprise evaluating the pulses identified in the action 206 to determine whether certain double tap conditions are satisfied. In certain embodiments, a double tap event is considered to have occurred if there is at least one pair of valid pulses within the energy curve that satisfies the following conditions:

The first and second pulses of the pair of valid pulses occur at a time interval that is less than a predetermined value, for example, 0.7 seconds.

The relationship between the power of the first of the valid pulses and the power of the second of the valid pulses is within a predefined relationship range. In the described embodiment, the ratio of these two powers should be between 0.333 and 3.0.

There is no non-valid pulse, whose power exceeds a power threshold, occurring between the pair of valid pulses. The power of the first valid pulse may be used as the power threshold.

An action 210 comprises declaring a double tap event if the above conditions have been satisfied.

The various criteria described above may be varied and used in different combinations depending on circumstances. In particular, some embodiments may not utilize all of the given criteria. However, situations may arise in other embodiments where additional criteria are incorporated into the methods described above.

The described tap event detection techniques may be used by the ARFN 102 to evaluate actions of a person, and to receive instructions or commands from a person. These or similar techniques may be used in conjunction with many different types of devices, such as general-purpose computers, game systems, industrial systems, and so forth. The described techniques may also be adapted to identify different numbers of sequential taps, in which the taps potentially have a varying rhythm or cadence.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors;
   a microphone;
   one or more computer-readable media storing computer-executable instructions that, when executed by the one or more processors, cause the one or more processors to perform acts comprising:
      producing an audio signal based at least in part on sound captured using the microphone, the microphone being located within a physical environment;
      identifying a sequence of amplitudes from the audio signal;
      detecting pulses in the sequence of amplitudes;
      determining whether one or more of the detected pulses is valid based at least in part on pulse duration, pulse symmetry, and whether a difference between a peak energy of each of the detected pulses and a noise energy in the physical environment at a peak time of each of the detected pulses is above a predetermined threshold; and
      identifying a double-tab event if:
         (a) a pair of valid pulses occurs within a time interval that is less than a predefined value;
         (b) a non-valid pulse with a power that exceeds a power threshold does not occur between the pair of valid pulses; and
         (c) the pair of valid pulses have a power relationship that is within a predefined relationship range.

2. The system of claim 1, wherein each amplitude is based on a plurality of audio samples derived from the audio signal.

3. The system of claim 1, wherein each amplitude comprises an energy amplitude.

4. The system of claim 1, wherein each pulse has a power, the power threshold being equal to the power of one pulse of the pair of valid pulses.

5. The system of claim 1, wherein the detecting comprises identifying peak amplitudes in the sequence of amplitudes, wherein each peak amplitude has adjacent amplitudes that are less than the peak amplitude.

6. The system of claim 1, wherein each pulse has a power, the acts further comprising calculating the power of an individual pulse as a function of pulse energy and pulse duration.

7. The system of claim 1, wherein each pulse has a symmetry, the acts further comprising calculating the symmetry of an individual pulse based at least in part on cumulative energy of a portion of the individual pulse.

8. The system of claim 1, wherein each pulse has a symmetry, the acts further comprising:
   calculating the symmetry of an individual pulse based at least in part on cumulative energy of a portion of the individual pulse;
   wherein determining whether the individual pulse is valid is based at least in part on the symmetry of the individual pulse.

9. A method comprising:
   generating an audio signal based on sound captured in a physical scene, the audio signal having a sequence of audio amplitudes;
   detecting pulses in the sequence of audio amplitudes, each pulse having a peak energy at a peak time of each audio amplitudes;
   determining whether one or more of the detected pulses are valid based at least in part on:
      pulse duration;
      pulse symmetry; and
      determining a difference between the peak energy of each of the detected pulses and a noise energy in the physical scene at the peak time of each of the detected pulses to determine if the difference is above a predetermined threshold;
   identifying a signal event based at least in part on a relationship between the valid pulses; and
   initiating an action in the physical scene based at least in part on identifying the signal event, the action comprising at least one of projecting content on a surface or providing an audio output.

10. The method of claim 9, wherein each pulse has a power, and wherein identifying the signal event is further based at least in part on:
    whether there is a pair of valid pulses occurring at a time interval that is less than a predefined value;
    whether there is a non-valid pulse, whose power exceeds a power threshold, occurring between the pair of valid pulses; and
    whether the pair of valid pulses have a power relationship that is within a predefined relationship range.

11. The method of claim 9, wherein each pulse has a power and power characteristics, wherein the power characteristics comprise the power of a first of the pair of valid pulses relative to the power of a second of the pair of valid pulses.

12. The method of claim 9, wherein each pulse has a power and power characteristics, wherein the power characteristics comprise the power of at least one of the valid pulses relative to the power of at least one non-valid pulse.

13. The method of claim 9, further comprising generating an individual audio energy amplitude based at least in part on a plurality of audio samples.

14. The method of claim 9, further comprising calculating a power of an individual pulse as a function of peak energy and pulse duration.

15. The method of claim 9, further comprising calculating the symmetry of an individual pulse based at least in part on a cumulative energy of a portion of the individual pulse.

16. One or more non-transitory computer-readable media storing computer-executable instructions that, when executed by one or more processors, cause the one or more processors to perform acts comprising:
    detecting pulses in a sequence of audio energy amplitudes representing audio captured from a physical environment;
    determining whether one or more of the detected pulses are valid based at least in part on pulse duration, pulse symmetry, and whether a difference between a peak energy of each of the detected pulses and a noise energy in the physical environment at a peak time of each of the detected pulses is above a predetermined threshold;
    identifying an audio event based at least in part on:
       whether there is a pair of the valid pulses occurring at an interval that is less than a predefined value; and
       whether a non-valid pulse with a power that exceeds a predefined power threshold does not occur between the pair of valid pulses; and
    initiating an action based at least in part on identifying the audio event, the action comprising at least one of projecting content or providing an audio output.

17. The one or more non-transitory computer-readable media of claim 16, wherein identifying the audio event is further based at least in part on whether the pair of valid pulses have a power relationship that is within a predefined relationship range.

18. The one or more non-transitory computer-readable media of claim 16, the acts further comprising generating an individual audio energy amplitude based at least in part on a summation of squared audio signal amplitudes corresponding to a segment of an audio signal.

19. The one or more non-transitory computer-readable media of claim 16, wherein each pulse has a symmetry, the acts further comprising calculating the symmetry of an individual pulse based at least in part on cumulative energy of a portion of the individual pulse.

20. The method of claim 9, wherein the peak energy is an energy value at the peak time of each amplitude in the sequence and wherein the predetermined threshold is 5 decibels.

\* \* \* \* \*